United States Patent [19]

Ogawa

[11] Patent Number: 4,922,160

[45] Date of Patent: May 1, 1990

[54] IMPEDANCE LOAD DRIVING CIRCUIT

[75] Inventor: Yoichi Ogawa, Saitama, Japan

[73] Assignee: Pioneer Electronic Corporation, Tokyo, Japan

[21] Appl. No.: 312,852

[22] Filed: Feb. 17, 1989

[30] Foreign Application Priority Data

Aug. 15, 1988 [JP] Japan ................................ 63-202825

[51] Int. Cl.[5] ............................................. G05B 11/00

[52] U.S. Cl. .................................... 318/135; 318/687; 361/152

[58] Field of Search ........................ 318/135, 678, 687; 361/152, 154, 187

[56] References Cited

U.S. PATENT DOCUMENTS 4,737,696 4/1988 Yokogawa et al. ................. 318/135

*Primary Examiner*—Patrick R. Salce

*Assistant Examiner*—Judson H. Jones

*Attorney, Agent, or Firm*—Finnegan, Henderson, Farabow, Garrett and Dunner

[57] ABSTRACT

A load driving circuit for supplying a load current proportional to an input signal to drive an impedance load. The load driving circuit includes a current detecting circuit for generating a load current signal representing a magnitude of a load current flowing through the impedance load, a voltage supply for producing a voltage signal corresponding to a difference between the load current signal and the input signal and for supplying the voltage signal to a first end of the impedance load, and an inverting voltage supply for inverting the voltage signal and for supplying an inverted the voltage signal to an opposite end of the impedance.

9 Claims, 3 Drawing Sheets

FIG. 3(A) INPUT SIGNAL
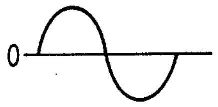
FIG. 3(B) OUTPUT VOLTAGE
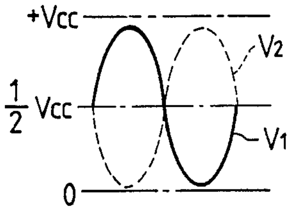
FIG. 3(C) LOAD CURRENT
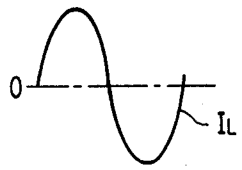
FIG. 6(A) INPUT SIGNAL
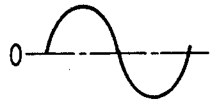
FIG. 6(B) OUTPUT VOLTAGE
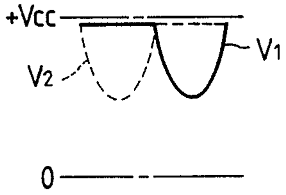
FIG. 6(C) LOAD CURRENT
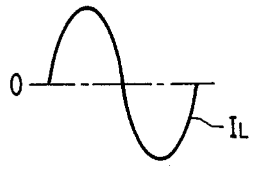

IMPEDANCE LOAD DRIVING CIRCUIT

FIELD OF THE INVENTION

The present invention relates to an improved load driving circuit for driving an impedance load of an actuator of a pick-up positioning slider in an optical information Recording/Playing apparatus.

BACKGROUND OF THE INVENTION

A disadvantaged impedance load driving circuit which is disclosed in U.S. Pat. No. 4,737,696 will be described hereinafter with reference to FIG. 4.

An input signal is supplied to a non-inverting amplifier 1 and an inverting amplifier 2. A load inductance 3 and a current detecting resistor 4 are connected in series between output terminals of the non-inverting amplifier 1 and the inverting amplifier 2. A load current $I_L$, flowing through the inductance 3, causes a voltage drop which is proportional to the load current $I_L$ across the current detecting resistor 4. A differential amplifier of a current detecting circuit 5 is supplied voltages from both ends of the current detecting resistor 4 in order to detect the amount of voltage drop. The current detecting circuit 5 generates a load current signal representing a value of the load current $I_L$, and feeds back this load current signal to both the non-inverting amplifier 1 and the inverting amplifier 2.

FIG. 5 shows exemplary circuit embodiments implementing block diagram portions shown in FIG. 4.

Non-inverting amplifier 1 consists of resistors 11, 13 and 14, an operational amplifier 12 and a constant voltage supply 15. Inverting amplifier 2 consists of resistors 21 and 22, an operational amplifier 23 and a constant voltage supply 24. The inductance 3 and the current detecting resistor 4 are connected in series between the output terminals of the operational amplifiers 12 and 23.

The current detecting circuit 5 consists of a differential amplifier 5*a* comprising resistors 51 to 54, a constant voltage supply 55 and an operational amplifier 56 and further consists of an output inverting circuit 5*b* receiving an output from the differential amplifier 5*a* and comprising resistors 57 and 58, an operational amplifier 5*g* and a constant voltage supply 60. In addition, the output of the differential amplifier 5*a* is also fed back through the resistor 22 to an inverting terminal of the operational amplifier 23. The output of the output inverting circuit 5*b* is supplied through the resistor 14 to an inverting terminal of the operational amplifier 12.

In the above disadvantaged approach, a feed-back loop consisting of the differential amplifier 5*a* and inverting amplifier 2 operates such that an output voltage of the operational amplifier 56 is fed as an input signal to the operational amplifier 23 to be amplified by an inverting amplifier gain $(-R_4/R_3)$ which is determined by a value $R_3$ of input resistor 21 and a value $R_4$ of feed back resistor 22. In further discussing the current detecting circuit 5, the value R of the feedback resistor 57 is set to be equal to the value R of the input resistor 58 so that an output signal from the output inverting circuit 5*b* is equal to but inverted in comparison to an output signal from the differential amplifier 5*a*. The output signal from the output inverting circuit 5*b* is fed as an input signal to the non-inverting amplifier 12 to be amplified by a non-inverting gain $(1+R_2/R_1)$ which is determined by a value $R_1$ of input resistor 13 and a value $R_2$ of feedback resistor 14.

Assuming, in the disadvantaged embodiment being described, that a resistance value Rc of the current detecting resistor 4 is set to be much smaller than a resistance value R of input resistors 51 and 52 of the differential amplifier (i.e., $Rc<<R$), then a current $I_L$ fed through the load inductance 3 is substantially equal to a current fed through the current detecting resistor 4. Accordingly, as shown in FIGS. 6(A) and 6(C), a level of current IL through load inductance 3 is proportional to the input signal being supplied to the input terminal and is independent of a characteristic of the load inductance 3. In other words, since the load driving circuit drives the load inductance 3 as current driving, the load driving circuit has advantages in that the current fed through the load inductance 3 is independent of the characteristics of the load impedance, and a power voltage is utilized efficiently.

While the output currents of the non-inverting amplifier 1 and the inverting amplifier 2 are controlled as described above, the output voltages $V_1$ and $V_2$ thereof are not controlled so that when there is a zero input signal and equal output voltages $V_1$ and $V_2$ are established (i.e., $V_1=V_2$), a no output current condition is established. During such an occurrence, the output voltages $V_1$ and $V_2$ saturate to the power source voltage $V_{cc}$ or the ground level as shown, for example, in FIG. 6(B) with output voltages saturated to the power source voltage Vcc. Furthermore, during times when the input voltage is positive, the output voltage $V_1$ becomes saturated at a $+V_{cc}$ level, and the load current is fed according to only a variation of the output voltage $V_2$. Similarly, during times when the input voltage is negative, the output voltage $V_2$ becomes saturated at a $+V_{cc}$ level, and the load current is fed according to only a variation of the output voltage $V_1$. During times when there is no or a zero input signal, the output voltages $V_1$ and $V_2$ both become saturated at a $+V_{cc}$ level, and accordingly, when an input signal is at a low level the load is driven proximate a non-linear range of the circuit arrangement. Consequently, the above-described circuit arrangement has disadvantages which may result in an inaccurate signal reproduction (e.g., cross over distortion) since the load current level does not respond to the input signal level accurately), an oscillation caused by an instability in the circuit operation, etc.

SUMMARY OF THE INVENTION

An object of the present invention is to provide an impedance driving circuit which operates with stability.

In order to attain the above-mentioned object. the impedance load driving circuit according to the present invention comprises a current detecting circuit which generates a load current signal representing a magnitude of a load current flowing through an impedance load, a first op amp which produces a voltage signal corresponding to a difference between the load current signal and an input signal and supplies this voltage signal to a first end of the load impedance, and finally, a second op amp which inverts the voltage signal and supplies an inverted said voltage signal to an opposite end of the load impedance.

BRIEF DESCRIPTION OF THE DRAWINGS

FIG. 3 includes waveform diagrams for an explanation of circuit operation according to the present invention.

FIG. 6 includes waveform diagrams for an explanation of circuit operation according to the disadvantaged approach.

DESCRIPTION OF THE PREFERRED EMBODIMENT

Figure 1:
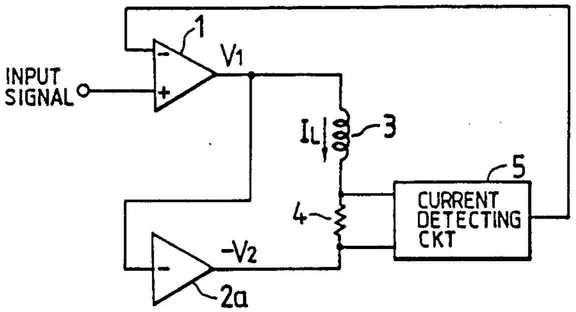
FIG. 1 is a block diagram showing an embodiment of the present invention.
Figure 4:
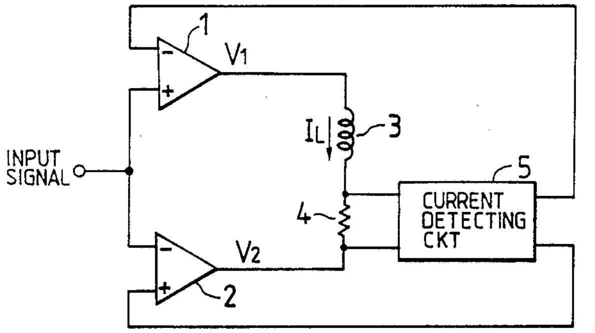
FIG. 4 PRIOR ART
FIG. 4 is a block diagram showing a disadvantaged approach.

An embodiment of the present invention is hereafter described with reference to the circuit shown in FIG. 1. In FIG. 1, parts corresponding to those which have been described with reference to FIG. 4 are designated by the same reference numeral.

A input signal is supplied only to a non inverting input terminal of a non-inverting amplifier 1. An output signal from a current detecting circuit 5 is supplied through a resistor 14 to an inverting input terminal of the non-inverting amplifier 12. An output voltage $V_1$ of the non-inverting amplifier 12 is supplied to an inverting amplifier *2a* which is configured to operate as an inverter. The inverting amplifier *2a* generates an output voltage $V_2$ which is proportional to but inverted with respect to the output $V_1$. A load inductance 3 and a current detecting resistor 4 are connected in series between the non-inverting amplifier 1 and the inverting amplifier *2a*. A voltage drop across the current detecting resistor 4 is detected by a current detecting circuit 5 so as to feed back a load current signal which is proportional to a load current $I_L$ to the non-inverting amplifier 1.

Figure 2:
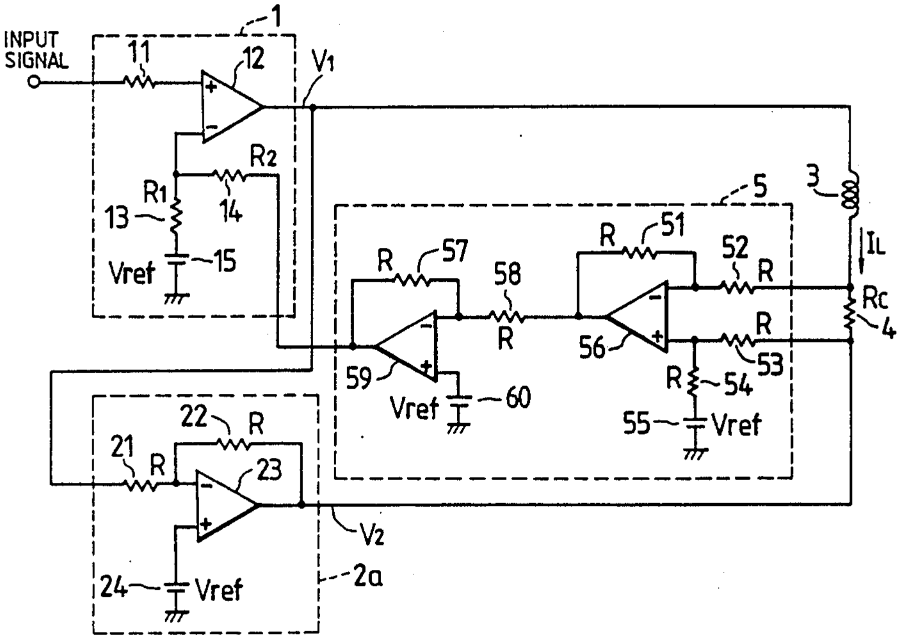
FIG. 2 is an exemplary circuit diagram implementing the embodiment shown in FIG. 1.
Figure 5:
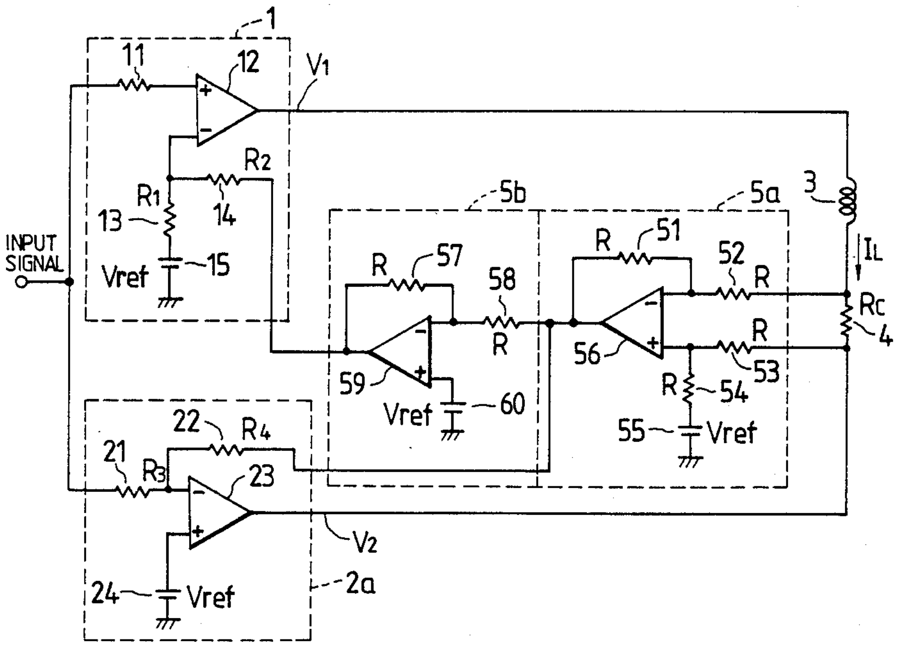
FIG. 5 is an exemplary circuit diagram implementing the disadvantaged approach shown in FIG. 4

FIG. 2 shows exemplary circuit embodiments implementing block diagram portions of FIG. 1, and parts corresponding to those which have been described with reference to FIG. 5 are designated by the same reference numeral.

As shown in FIG. 2, an inverting amplifier *2a* consists of resistors 21 and 22, an operational amplifier 23 and a constant voltage supply 24, wherein resistors 21 and 22 are set to a same resistance value R. An output signal from the operational amplifier 12 is supplied through an input resistor 21 to a non-inverting terminal of the operational amplifier 23. An output terminal of the operational amplifier 23 is connected to an end of the current detecting resistor 4. The present invention as depicted in FIG. 2 further differs from the disadvantaged approach of FIGS. 4 and 5 in that there is no feedback between the output of the operational amplifier 56 back to the inverting amplifier *2a*.

In the advantaged arrangement of the present invention, the inverting amplifier *2a* generates an output voltage $V_2$ which is proportional to but complementary in phase to the output voltage $V_1$ of the non-inverting amplifier. Output voltages $V_1$ and $V_2$ are applied to opposite ends of the load circuit, respectively. The non-inverting amplifier 1 and the current detecting circuit 5 constitute a current feedback loop so as to provide a feedback current. As a result, when the input signal shown in FIG. 3(A) is supplied to the driving circuit, a load current $I_L$ (as shown in FIG. 3(C)) which is similar to the input signal is supplied to the impedance load.

In addition to the above, the output voltage $V_1$ of the non-inverting amplifier and the output voltage $V_2$ of the inverting amplifier shown in FIG. 3(B) are varied complementary to each other. When an input signal is at a zero level, the current feedback loop operates to make the load current $I_L$ equal to a zero level so that the output voltage $V_1$ of the amplifier 1 and the output voltage $V_2$ of the amplifier *2a* are at a same substantially intermediate level of the power source voltage Vcc. Upon application of a non-zero input signal, the output voltages of the amplifiers 1 and *2a* raise up complementarily from this intermediate value according to the input signal, and operate within a linear range of the circuit arrangement. Accordingly, the present invention avoids the previously-mentioned disadvantages such as inaccurate signal reproduction (e.g., cross-over distortion), instable oscillations, etc.

While the load driving circuit of the present invention is described using a uni-polarity power supply +Vcc, the power supply is not limited thereto. That is, a bipolarity power supply ± Vcc can be used for the driving circuit according to and within the scope of the present invention.

Further, a transformer utilizing a ferrite core may be substituted for the current detecting resistor 4 as a current detecting means.

As described above, the load impedance driving circuit operates to apply a voltage according to a difference between a load current and an input signal since the impedance driving circuit supplies load currents (having a level corresponding to the input signal) in positive and negative directions to the impedance load circuit. As a further advantage, complementary voltages are applied to opposite ends of a load impedance. As a result of the foregoing, when an input signal is equal to a zero level, the output level of the amplifier reflects an intermediate value of the power supply voltage, and the driving circuit operates with linear output characteristics during non-zero input signals. Accordingly, signal distortion is avoided and circuit oscillations are inhibited, and thus an operation of the impedance load driving circuit is stabilized.

I claim:

1. A load driving circuit for supplying a load current proportional to an input signal in order to drive an impedance load, said load driving circuit comprising:

current detecting means for generating a load current signal representing a magnitude of a load current flowing through said impedance load;

voltage supply means for producing a voltage signal corresponding to a difference between said load current signal and said input signal, and for supplying said voltage signal to a first end of said impedance load; and inverting voltage supply means for inverting said voltage signal, and for supplying an inverted said voltage signal to an opposite end of said impedance load.

2. A load driving circuit as claimed in claim 1, wherein said voltage supply means is first op amp means, and wherein said inverting voltage supply means is second op amp means.

3. A load driving circuit as claimed in claim 2:

wherein said first op amp means comprises a first op amp having a first input for receiving said input signal, a second input connected to receive said load current signal, and an output connected to said first end of said impedance load; and wherein said second op amp means comprises second op amp having an input connected to receive said voltage signal, and an output connected to said opposite end of impedance load.

4. A load driving circuit as claimed in claim 3 wherein said impedance load comprises load resistor means.

5. A load driving circuit as claimed in claim 4 wherein said current detecting means comprises differential amplifier means and inverting circuit means.

6. A load driving circuit as claimed in claim 5:

wherein said differential amplifier means has first and second inputs connected to opposite ends of said load resistor means, and said differential amplifier means outputs a differential signal; and wherein said inverting circuit means has an input connected to receive said differential signal, and an output connected to supply said load current signal to said second input of said first op amp means.

7. A load driving circuit as claimed in claim 6 wherein said load driving circuit is for driving an impedance load of an actuator of a pick-up positioning slider in an optical information recording/playing apparatus.

8. A load driving circuit as claimed in claim 7 wherein said load resistor means is a resistor.

9. A load driving circuit as claimed in claim 7 wherein said load resistor means is a transformer means utilizing a ferrite core.

* * * * *